United States Patent [19]
Kamata

[11] 4,382,661
[45] May 10, 1983

[54] ZOOM LENS BARREL CAPABLE OF CLOSE UP PHOTOGRAPHY

[75] Inventor: Shigeru Kamata, Tokyo, Japan

[73] Assignee: Canon Kabushiki Kaisha, Tokyo, Japan

[21] Appl. No.: 175,711

[22] Filed: Aug. 6, 1980

Related U.S. Application Data

[62] Division of Ser. No. 134,798, Mar. 28, 1980, Pat. No. 4,286,845.

[30] Foreign Application Priority Data

Apr. 6, 1979 [JP] Japan .................... 54/42333

[51] Int. Cl.³ ................... G02B 7/10; G02B 15/16
[52] U.S. Cl. .............................................. 350/430
[58] Field of Search ............................. 350/430, 429

[56] References Cited

U.S. PATENT DOCUMENTS

| | | | |
|---|---|---|---|
| 3,884,555 | 5/1975 | Suwa et al. .......................... | 350/430 |
| 4,099,847 | 7/1978 | Ito ........................................ | 350/430 |
| 4,255,020 | 3/1981 | Yukio ................................... | 350/430 |

*Primary Examiner*—Jon W. Henry
*Attorney, Agent, or Firm*—Toren, McGeady and Stanger

[57] ABSTRACT

A zoom lens barrel which is capable of zoom and close up photography includes a generally cylindrical barrel part, one end of which is mountable to a camera body. Optical system having an optical axis which coincides with the axis of the barrel part is arranged in the barrel part for relative sliding movement to perform zoom and close up photography. A generally cylindrical guide member is coaxially rotatably mounted on the barrel part and has a number of guide slots for engaging the optical system. The guide member also has a guide edge formed on one end, and is axially movable between a first position whereat the guide slots axially guide the optical system relative to the barrel part so that the optical system zooms on an object to be photographed when the guide member is rotated, and a second position whereat the guide member axially displaces the optical system for close up photography of the object. An operation member is mounted on the barrel part next to the guide edge of the guide member for engaging the guide edge of the guide member to move it in the direction of the optical axis between the first and second positions.

5 Claims, 8 Drawing Figures

ZOOM LENS BARREL CAPABLE OF CLOSE UP PHOTOGRAPHY

This is a division of application Ser. No. 134,798 filed on Mar. 28, 1980, now U.S. Pat. No. 4,286,845.

BACKGROUND OF THE INVENTION

The present invention relates generally to zoom lenses, and particularly to a zoom lens which can be actuated to perform close up photography at either the telephoto end or the wide angle end of the range of its optical system.

Zoom lens barrels which can be used for close up photography are known, an example being disclosed in U.S. Pat. No. 3,613,544. A cylindrical guide member is typically used to control movement of the optical system in the zoom lens barrel so as to properly vary the magnification factor, and a guide groove in the guide member, which engages a cam, serves to select a close up photographing range when the guide member is rotated about the lens barrel axis. The guide groove is usually formed as an extension of the groove provided in the guide member which corresponds to the zoom photographing range. However, such an arrangement has the disadvantage that the overall length of the guide groove becomes undesirably long. This is so because, in order to enable zoom photography to be carried out smoothly by rotation of the cylindrical guide member, several guide grooves must be provided in the circumferential surface of the guide member, each groove serving to transfer movement to one of a number of lens systems in the barrel. When the length of a guide groove is too long, the distance between adjacent guide grooves in the guide member becomes relatively small, giving rise to poor accuracy and the possibility of deformation of the guide member during manufacture. While these disadvantages may be overcome by increasing the wall thickness or axial length of the guide member, such dimensional changes will increase the overall diameter and/or length of the lens barrel, so that such changes are not a desirable countermeasure.

Further, U.S. Pat. No. 4,099,847 discloses the use of a cylindrical guide member, which is engaged in a fixed portion of the lens barrel, to control movement of the lens systems in the barrel between a zoom photographing range and a close up photographing range. In lens barrels capable of both zoom photography and close up photography, the lens systems are moved in the lens barrel in the direction of the optical axis in order to focus on an object to be photographed. A number of lens systems for providing variation of the magnification factor and for optical compensation are thus moved by following guide surfaces or grooves formed in the cylindrical guide member as the guide member is rotated.

Consequently, the positioning of the guide member on the lens barrel is most important. However, since the guide member is usually arranged either on an internal or external surface of a fixed part of the lens barrel, adjustment of its position from the outside, particularly along the direction of the optical axis, is extremely difficult. Thus, it is difficult to accurately control the optical distance between the principal point of the lens systems and the standard position for the lens barrel mount. This results in a lower efficiency for the zoom lens.

An object of the present invention is to eliminate the above-mentioned shortcomings in the conventional zoom lenses, and to enable close up photography without the necessity of providing a guide member groove which is an extension of the guide groove provided for the zoom photographing range.

Another object of the present invention is to provide a zoom lens capable of close up photography at both the telephoto and the wide angle ends of the range of the lens barrel optical systems, as well as at any point within the operational range of the lens.

A further object of the present invention is to provide a zoom lens which can be placed into a close up photography mode of operation by way of an operating member which is separate from the focusing and zoom operation members to avoid misoperation while a photographer is taking a picture in the ordinary zoom photographing range.

Yet another object of the present invention is to provide an adjustable, high precision zoom lens barrel which can be easily assembled wherein the position of the cylindrical guide member on the lens barrel can be adjusted in the direction of the optical axis of the lens barrel to change over between the zoom and close up photography operating modes.

In accordance with the present invention, a zoom lens barrel for use in zoom and close up photography includes a cylindrical barrel part one end of which is arranged to be mounted on a camera body. An optical system is provided within the barrel part for performing zoom and close up photography, the system having an optical axis which coincides with the axis of the barrel part and being arranged for axial sliding movement relative to the barrel part. A generally cylindrical guide member is coaxially rotatably mounted on the barrel part, the guide member having a number of guide slots for engaging the optical system and a guide edge formed on one end of the guide member. The guide member is axially movable between a first position whereat the guide slots axially guide the optical means relative to the barrel part so that the system zooms on an object to be photographed when the guide member is rotated, and a second position whereat the guide member axially displaces the optical system for close up photography of the object. An operation member is mounted on the barrel part next to the guide edge on the guide member for engaging the guide edge to move the guide member axially between the first and second positions.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there are illustrated and described preferred embodiments of the invention.

DETAILED DESCRIPTION OF THE INVENTION

Figure 1:
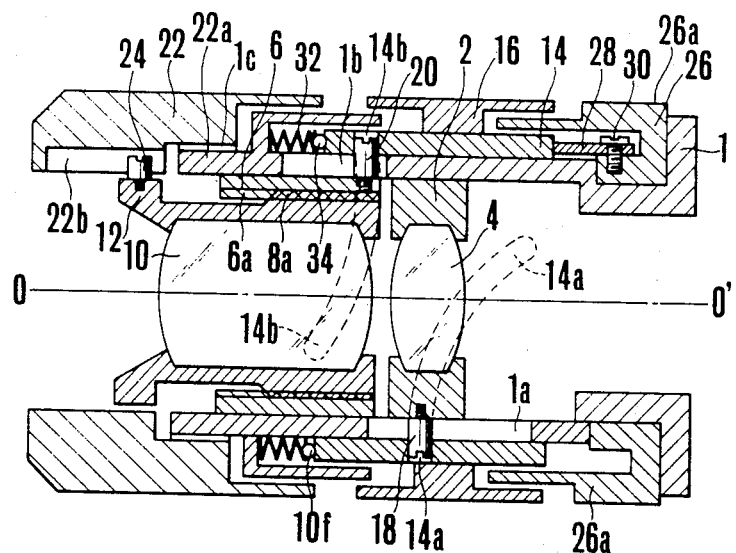
FIG. 1 is a sectional view taken along the optical axis of a first embodiment of a zoom lens barrel according to the present invention.
Figure 2:
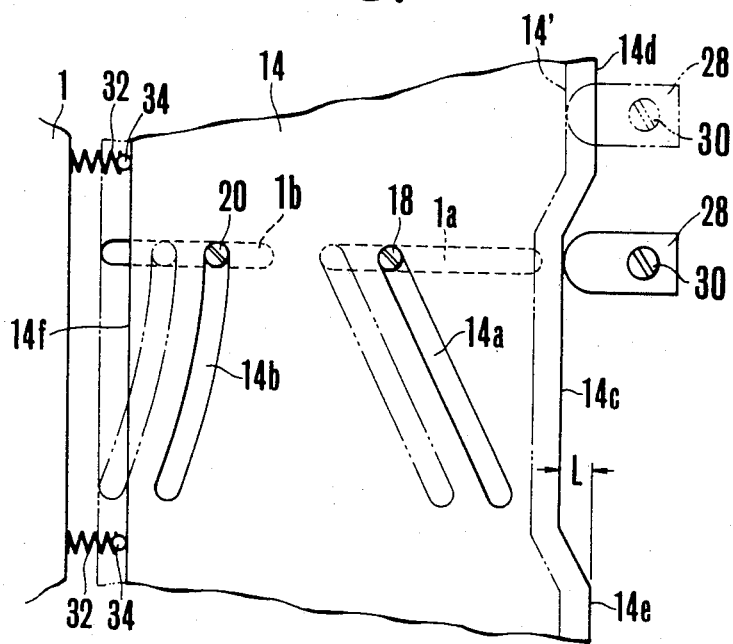
FIG. 2 is an enlarged partial view of a cylindrical guide member in the lens barrel of FIG. 1.

FIGS. 1 and 2 show a generally cylindrical fixed part 1 of a lens barrel. At the right end of the barrel part 1, as viewed in FIG. 1, a connecting arrangement (not shown) is provided for mounting the barrel part 1 to a camera body (not shown). A first annular member 2 is arranged for axial sliding movement within the barrel part 1 in the direction of the lens barrel optical axis 0-0'. The first member 2 holds and guides a first optical system 4 for movement within the lens barrel. A second annular member 6 is arranged for axial sliding movement within the barrel part 1 in the direction of the optical axis 0-0'. The second member 6 surrounds an annular holding member 12 which holds and guides a second optical system 10 for axial movement within the lens barrel. A helical thread 6a formed on the inner circumferential surface of the second member 6 engages a helical thread 8a formed on the outer circumferential surface of the annular holding member 12. Thus, the second optical system 10 can be moved in the direction of the optical axis 0-0' by rotation of the holding member 12 relative to the second annular member 6.

A generally cylindrical guide member 14 is arranged coaxially over the outer circumferential surface of the barrel part 1. Guide member 14 has guide grooves or slots 14a and 14b (see FIG. 2) provided therein, these grooves enabling the magnification provided by the first and second optical systems 4, 10 to be varied efficiently. A zoom operation ring 16 is fixed to the outer circumferential surface of the guide member 14 to allow the guide member to be rotated from the outside. The zoom operation member 16 may be integral with the guide member 14.

A pin 18 extends radially outwardly from the first annular member 2 which holds the first optical system 4. Pin 18 passes through a groove or slot 1a which extends longitudinally in the circumferential surface of the barrel part 1. Pin 18 also engages the guide groove 14a in the guide member 14, thereby enabling the first optical system 4 to be moved in the direction of the optical axis 0-0' by rotation of the guide member 14.

A pin 20 extends radially outwardly from the surface of the second annular member 6 and passes through a straight groove or slot 1b which extends longitudinally in the circumferential surface of the barrel part 1, the pin 20 engaging the guide groove 14b in the guide member 14. Accordingly, the second optical system 10 is also moved in the direction of optical axis 0-0' upon rotation of the guide member 14.

A generally cylindrical distance adjusting or focusing member 22 extends coaxially over the end of the barrel part 1 further from the camera. Focusing member 22 has a helical thread 22a formed on its inner circumferential surface for engaging a helical thread 1c formed on the outer circumferential surface of the barrel part 1. Accordingly, focusing member 22 will move in the direction of optical axis 0-0' when it is rotated about the axis.

A pin 24 extends radially outwardly from one end of the holding member 12 to engage a longitudinally extending groove 22b in the inner circumferential surface of the focusing member 22. Thus, when the focusing member 22 is rotated, the holding member 12 will also be rotated by way of the pin 24. The second optical system 10 will then rotate and move axially relative to the second annular member 6 so as to effect a distance adjustment.

An annular, close up photography operation member 26 is arranged coaxially over the barrel part 1, and is seated in an annular recess in the barrel part 1 for rotational movement about optical axis 0-0'. Operation member 26 allows the operating mode of the lens barrel to be changed between close up photography and zoom photography. An outer circumferential portion 26a of the operation member 26 is exposed on the external surface of the lens barrel, and a cam 28 extends from the end of the operation member 26 which faces the guide member 14. The cam 28 contacts an edge of the guide member 14 and is fixed to the operation member 26 by a screw 30. An elongated hole is provided in the cam 28 for the screw 30, so that the guide member 14 can be moved in the direction of the optical axis 0-0' to allow initial distance adjustments such as back focus of the lens systems to be easily made.

As shown in FIG. 2, the guide member 14 has the guide grooves 14a and 14b for providing the desired variation in magnification factor and the required optical compensation by causing the pins 18, 20, associated with the first and second lens systems 4, 10, to move in the direction of the optical axis 0-0' when the guide member 14 is rotated about the axis. Further, guide member 14 has at its end facing the cam 28 a cam plane or edge 14c which serves to maintain the guide member 14 axially fixed between the telephoto and wide angle ends of the zoom range. Member 14 also has an edge 14d to enable close up photography to be selected at the telephoto end of the range, and an edge 14e to enable close up photography to be selected at the wide angle end of the range. At the axial end of the guide member 14 opposite the end on which the edges 14c, 14d and 14e are provided, the guide member 14 has an edge 14f. Rollers 34 are urged against the guide member edge 14f by spring members 32 extending from the barrel part 1.

Both the zoom and close up photographing modes of operation of the lens barrel of FIGS. 1 and 2 will now be explained in detail.

When the cam 28 fixed to the close up photography operation member 26 is in contact with the edge 14c on the guide member 14, the lens barrel will provide normal zoom operation. That is, the positions of the first optical system 4 and the second optical system 10 relative to the optical axis 0-0' can be varied upon rotation of the zoom operation ring 16. The first and second optical systems 4, 10 will move at the rates determined by the paths of the grooves 14a, 14b in the guide member 14, the optical systems 4, 10 moving axially within the barrel part 1 by way of the pins 18, 20 to provide a variable magnification factor along with optical compensation.

When a desired optical magnification is obtained by rotating the zoom operation ring 16 to a particular position relative to the barrel part 1, focusing on the object to be photographed is then performed by rotation of the focusing member 22, thereby moving the second optical system 10 toward or away from the camera along the direction of optical axis 0-0' as a result of the threaded engagement between the holding member 12 and the second annular member 6, and the engagement of pin 24 in slot 22b.

The lens barrel can then be changed over from the zoom photography mode into the close up photography mode by rotation of the close up photography operation member 26 in either direction. The cam 28 will then move from contact with the edge 14c into contact with edge 14d or 14e, thereby causing the guide member 14 to move axially by a distance L against the bias force provided by the spring members 32 and rollers 34. Accordingly, both the first and the second optical systems 4, 10 are moved to a close up photography position relative to barrel part 1.

Figure 3:
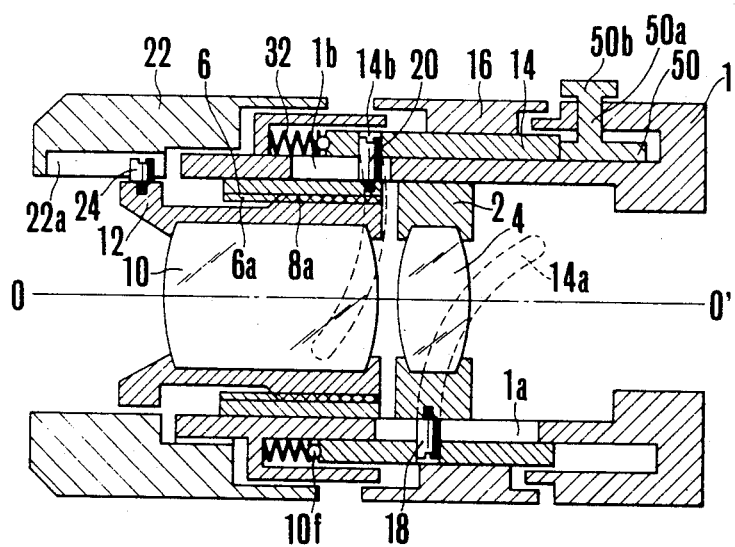
FIG. 3 is a sectional view taken along the optical axis of a second embodiment of a zoom lens barrel according to the present invention.
Figure 4:
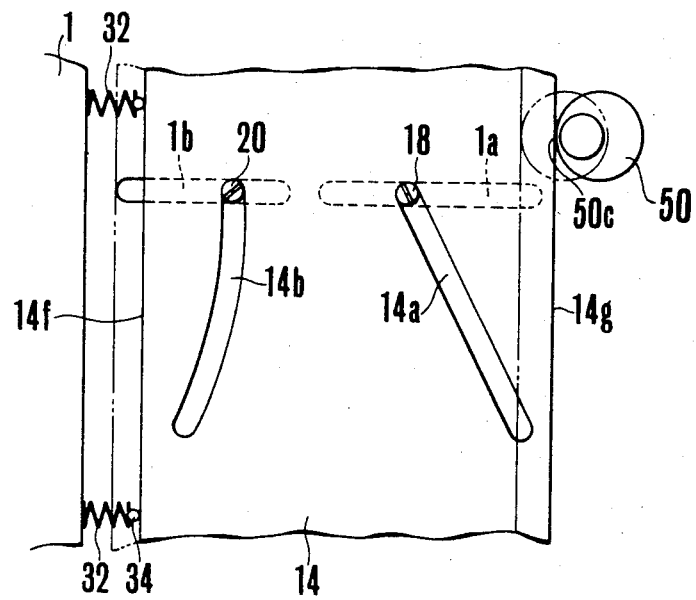
FIG. 4 is an enlarged, partial view of a cylindrical guide member in the lens barrel of FIG. 3.

FIGS. 3 and 4 show another embodiment of the present invention wherein parts which are similar to those in the embodiment of FIGS. 1 and 2 are indicated by the same reference characters.

As in the embodiment of FIGS. 1 and 2, the guide member 14 shown in FIGS. 3 and 4 has guide grooves or slots 14a and 14b for engaging pins 18, 20 connected with the first and second optical systems 4, 10, and for moving the optical systems 4, 10 along optical axis 0-0' through a zoom photography range. However, the edges 14c, 14d and 14e on the guide member in the previous embodiment are replaced by a single end plane or edge 14g on the guide member 14. Further, an eccentric cam 50 is supported by the barrel part 1 for rotation about the axis of cam shaft 50a which extends through the barrel part 1. A changeover operation member 50b at the exterior of the barrel part 1 is integrally formed at the other end of the shaft 50a. The eccentric cam 50 is in contact with the edge 14g so that, upon rotation of the changeover operation member 50b, the guide member 14 is moved in the direction of the optical axis 0-0'. The first and second optical systems 4, 10 then move in the same direction in accordance with the degree of eccentricity of the cam 50. When cam 50 has its least eccentric point 50c relative to shaft 50a in contact with edge 14g, the guide member 14 is in the zoom photography mode. The first and second optical systems 4, 10 will move in the direction of the optical axis 0-0' in accordance with the guide grooves 14a, 14b upon rotation of the zoom operation ring 16, thereby providing variable magnification and compensation.

The lens barrel can then be changed over into the close up photography mode by rotating the operation member 50b so that the most eccentric point of the cam 50 contacts the guide member edge 14g. The guide member is then axially moved against the bias force applied to its edge 14f by the rollers 34 and spring members 32, so that the guide member is displaced from the position shown in solid lines in FIG. 4 to the position indicated by the two-dot chain line, wherein both of the optical systems 4, 10 are displaced in the direction of the optical axis 0-0' in accordance with the maximum eccentricity of the cam 50.

FIGS. 5-8 show further embodiments of a zoom lens barrel according to the present invention, wherein the cylindrical guide member which controls movement of the optical systems can be finely adjusted in the direction of the optical axis 0-0'. In these figures, parts which are similar to those described above are indicated with the same reference characters.

As with the embodiments described above, a generally cylindrical fixed part 1 of a lens barrel has a connecting arrangement at one end (not shown) for mounting the lens barrel to a camera body (not shown). A first annular member 2 is arranged for axial sliding movement along the inner circumferential surface of the barrel part 1. A pin 18 extends radially outwardly from the member 2 and passes through an axially extending slot 1a in the barrel part 1 to engage a guide groove or slot 42a formed in a cylindrical guide member 42. A first optical system 4 held by the annular member 2 is moved by way of the pin 18 in the direction of the optical axis 0-0' upon rotation of the guide member 42. An annular holding member 12 is provided for holding and moving a second optical system 10 in alignment with the optical axis 0-0'. A second annular member 6 is secured coaxially against the inner circumferential surface of the barrel part 1, and has a helical thread 6a formed on its inner circumferential surface. The thread 6a engages a helical thread 12a formed on the outer circumferential surface of the holding member 12, so that the second optical system 10 can be axially displaced by rotation of the holding member 12. A pin 20 extends radially outwardly from the surface of the annular member 6, and passes through an axially extending slot 1b in the barrel part 1 to engage a groove 42b in the guide member 42. The second optical system 10 will then move by way of the pin 20 in the direction of the optical axis 0-0' upon rotation of the guide member 42.

The guide member 42 is arranged to extend over the outside surface of the barrel part 1. The guide grooves 42a, 42b serve to set the distance between the first and second optical systems 4, 10 in accordance with the desired magnification and the optical compensation, the paths of the guide grooves 42a, 42b acting to determine the distance between the first and the second optical systems 4, 10 as the pins 18, 20 engage the grooves 42a, 42b and the guide member 42 is rotated.

A third guide groove or slot 42c is provided in the guide member 42, and a pin 44 which extends radially from the barrel part 1 engages this groove. A section $42c_1$ of the third groove serves to maintain the guide member 42 at a suitable position relative to the optical axis 0-0' through the zoom photography adjustment range of the lens barrel. Preferably, the pin 44 is supported for eccentric movement so that the guide member 42 can be adjustably moved a certain axial distance from a reference position when the pin 44 is rotated. Also, a zoom operation ring 16 is fixed coaxially about the outer surface of the guide member 42, as shown.

A generally cylindrical focusing member 22 extends coaxially from the end of the barrel part 1 further from the camera. A helical thread 22a formed on the inner circumferential surface of the focusing member 22 engages a helical thread 1c formed on the outer circumferential surface of the barrel part 1. A pin 24 extends radially outwardly from the holding member 12 and engages an axially extending groove 22b in the inner circumferential surface of the focusing member 22. A third optical system 46 may also be provided and held in axial alignment by the barrel part 1.

Figures 5, 6:
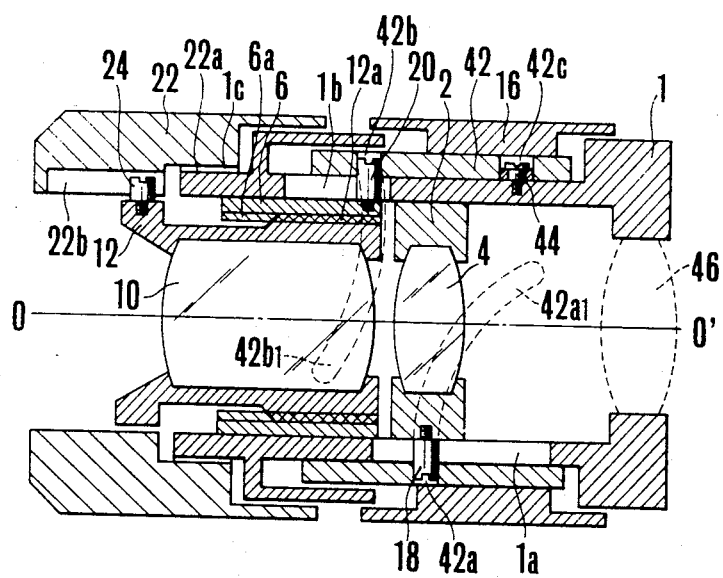
FIG. 5 is a sectional view taken along the optical axis of a third embodiment of a zoom lens barrel according to the present invention.
FIG. 6 is an enlarged, partial view of a cylindrical guide member in the lens barrel of FIG. 5.

Referring to FIG. 6, guide groove 42a has a set of guide groove sections $42a_1$, $42a_2$ and $42a_3$ for controlling the movement of the first optical system 4. A set of groove sections $42b_1$, $42b_2$ and $42b_3$ forming the groove 42b are provided for controlling the movement of the second optical system 10, and another set of groove sections $42c_1$, $42c_2$ and $42c_3$ forming the groove 42c determine the axial position of the guide member 42 relative to the barrel part 1.

Within the normal zoom photography range, the groove sections $42a_1$ and $42b_1$ serve to determine the distance between the first and second optical systems 4, 10. The groove sections $42a_2$, $42b_2$ and $42a_3$, $42b_3$ act to hold the optical systems 4, 10 at fixed distances from one another when they are both axially displaced by the guide member 42 for close up photography either at the telephoto or at the wide angle end of the zoom operating range.

In each set, the groove sections $42a_1$, $42a_2$ and $42a_3$, and the groove sections $42b_1$, $42b_2$ and $42b_3$ are serially connected. The groove sections $42a_2$ and $42a_3$ and the groove sections $42b_2$ and $42b_3$ extend parallel to one another, each of these groove sections extending along the circumference of the guide member 42 and perpendicularly to the optical axis 0-0'.

The groove section $42c_1$ serves to hold the guide member 42 at a suitable axial position relative to the optical axis 0-0' for carrying out normal zoom photography between the ends of groove section $42c_1$ which correspond to the telephoto and wide angle ends of the zoom photography range. Groove sections $42c_2$ and $42c_3$ act to displace the guide member 42 axially at the telephoto and wide angle ends of the zoom photography range to a position whereat close up photography can be carried out.

The operation of the zoom lens barrel of FIGS. 5 and 6 wil now be explained in detail.

During a normal zoom photography operation, the pin 44 extending from the barrel part 1 engages the groove section $42c_1$ so that the guide member 42 is held at a certain axial position relative to the barrel part 1 over the range of rotation L1 of the guide member 42. Guide member 42 is rotated by turning the zoom operation member 16, and the pins 18,20 extending from the holding member 2 and the annular member 6 of the first and second optical systems 4,10 are guided by the groove sections $42a_1$ and $42b_1$. Accordingly, the axial distance between the first and second optical systems 4,10 will be determined by the groove sections $42a_1$ and $42b_1$ to vary the magnification factor and optical compensation.

The object focus adjustment is carried out by movement of the second optical system 10 in the direction of the optical axis 0-0' either toward or away from the camera. The second optical system 10 is axially moved by rotation of the holding member 12 relative to the annular member 6 as the focusing member 22 is rotated and the pin 24 slidably engages the groove $22b$ in the focusing member 22.

When the zoom photography operation member 16 is turned to rotate the guide member 42 in the direction of arrow A (FIG. 6), and the pins 18, 20, and 44 are at the positions shown in the drawing (the optical systems 4,10 are at the telephoto end of the zoom range), changeover from the zoom photography mode into the close up photography mode will occur when the pin 44, which was engaged in the groove section $42c_1$ moves into the groove section $42c_2$ in such a manner that the guide member 42 and the optical systems 4,10 are displaced together in the direction of the optical axis 0-0' by a distance $l_1$. This movement brings the optical systems 4,10 into the close up photography mode of operation.

During the displacement of the guide member 42 from the zoom photography mode to the close up photography mode at the telephoto end of the zoom range, the distance between the optical systems 4,10 required for close up photography is maintained by way of the groove sections $42a_2$ and $42b_2$ which are parallel to each other as they extend from the groove sections $42a_1$ and $42b_1$. The close up photography mode can also be carried out at the wide angle end of the zoom range by movement of the pins out of the positions 18', 20' and 44' into the groove sections $42a_3$, $42b_3$ and $42c_3$, thereby axially displacing the guide member 42 and the optical systems 4,10. The object distance or focus adjustment in the close up photography mode is carried out by way of axial movement of the second optical system 10 either toward or away from the camera, in the same manner as in the case of the zoom photography mode, by rotation of the distance adjusting member 22.

Figure 7:
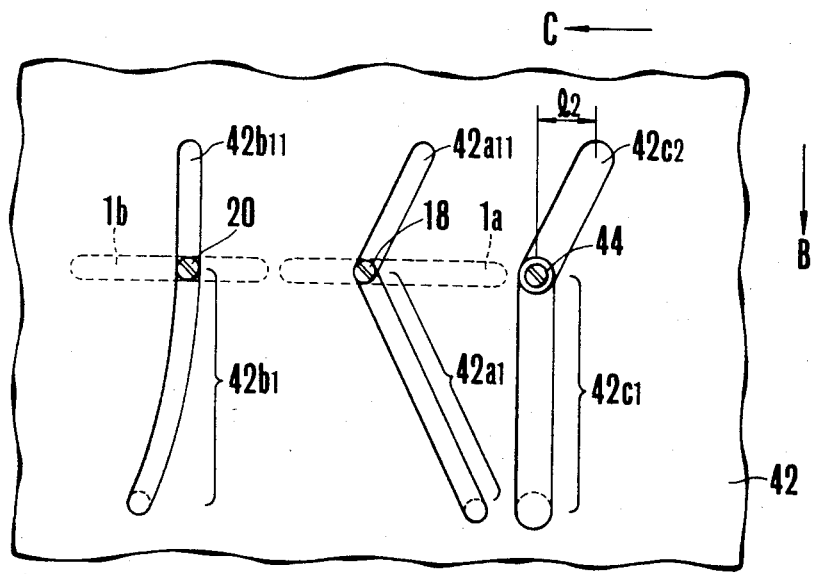
FIG. 7 is an enlarged partial view of a cylindrical guide member which can be used in a fourth embodiment of the present invention.

FIG. 7 shows a portion of the guide member 42 wherein parts similar to those described above are indicated by the same reference characters. The guide member 42 of FIG. 7 allows close up photography to be carried out at the telephoto end of the zoom lens range. Groove section $42a_{11}$ serves to axially move the first optical system 4, and extends parallel to groove section $42c_2$ which serves to axially displace the guide member 42. Groove section $42b_{11}$ operates to axially move the second optical system 10, and extends along the circumference of the guide member 42, perpendicularly to the optical axis 0-0'.

When the guide member 42 is rotated in the direction of arrow B, it is axially displaced in the direction of arrow C (toward the object), while the first optical system 4 is held at its initial position. The second optical system 10 is advanced in the direction of the arrow C by a distance $l_2$ to vary the distance between the second optical system 10 and the first optical system 4, wherein close up photography is made possible at the telephoto end of the zoom range.

Figure 8:
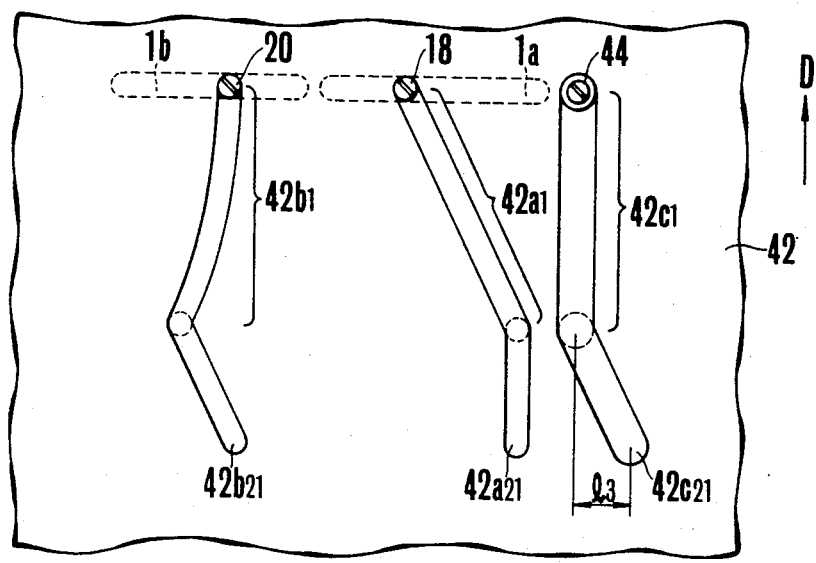
FIG. 8 is an enlarged partial view of a cylindrical guide member which can be used in a fifth embodiment of the present invention.

FIG. 8 shows a further modification of the guide member 42, wherein parts similar to those discussed above are indicated by the same reference characters. The embodiment of FIG. 8 enables close up photography to be carried out at the wide angle end of the zoom range. Groove section $42c_{21}$ is provided for axially displacing the guide member 42. Groove sections $42b_1$ and $42b_{21}$ which serve to axially move the second optical system 10 are serially connected, the groove section $42b_{21}$ extending parallel to the groove section $42c_{21}$. Groove sections $42a_1$ and $42a_{21}$ which serve to axially move the first optical system 4 are also serially connected, the groove section $42a_{21}$ extending along the circumference of the guide member 42, perpendicularly to the optical axis 0-0'.

When the guide member 42 is rotated in the direction of arrow D in FIG. 8, it is axially displaced by a distance $l_3$. The second optical system 10 remains at its initial position and the first optical system 4 is axially displaced by the distance $l_3$, so that close up photography at the wide angle end of the zoom range is then possible.

In accordance with the present invention, the guide member 42 is displaced in the direction of the optical axis 0-0' by an arrangement (guide groove $42c_1$, pin 44) which holds the guide member 42 at a certain position relative to the barrel part 1 over an operating range for zoom photography, and by a further arrangement (groove sections $42c_2$, $42c_3$ and pin 44) which axially displaces the guide member 42 to enable closeup photography.

Moreover, the first optical system 4 and the second optical system 10 are each guided by the groove sections 42a (42a₁, 42a₂, 42a₃, 42a₁₁, 42a₂₁) and 42b (42b₁, 42b₂, 42b₃, 42b₁₁, 42b₂₁) through the pins 18, 20, so that the axial distance between the optical systems is varied in a predetermined manner. Thus, the positioning of the optical systems within the lens barrel, and the adjustment of the distances between them and the camera, are carried out with relative ease by adjusting the reference position of the guide member 42 relative to the barrel part 1 through an adjustment mechanism (eccentric pin 44 or an eccentric roller). In view of the above construction and arrangement, the present invention enables closeup photographs to be carried out easily either at the telephoto end or the wide angle end of the zoom range by axially displacing the guide member 42 fixed to the operation member 16 in a relatively simple manner. Thus, the construction as well as the operation of the zoom lens barrel is simplified.

While specific embodiments of the invention have been shown and described in detail to illustrate the application of the inventive principles, it will be understood that the invention may be embodied otherwise without departing from such principles.

What is claimed is:

1. A zoom lens barrel for use in zoom and close up photography, comprising:
    (a) a generally cylindrical barrel part one end of which is arranged to be mounted to a camera body;
    (b) optical means within said barrel part for performing zoom and close up photography, wherein said optical means has an optical axis which is parallel to the axis of said barrel part and said optical means is arranged for sliding movement relative to said barrel part in the direction of said optical axis;
    (c) a generally cylindrical guide member coaxially rotatably mounted on said barrel part and including first guide slot means for engaging said optical means and second guide slot means for engaging said barrel part to axially move said guide member between first and second positions when said guide member is rotated, wherein said first guide slot means axially moves said optical means relative to said barrel part so that said optical means zooms on an object to be photographed when said guide member is rotated over a certain range at said first position and said first guide slot means axially moves said optical means for close up photography of the object when said guide member is at said second position, said second guide slot means being arranged to maintain said guide member at said first position when said guide member is rotated over said certain range and to move said guide member to said second position when said guide member is rotated beyond said certain range; and
    (d) an operation member secured to said guide member for moving said guide member to select a desired photographing operation.

2. A zoom lens barrel according to claim 1, including at least one pin member associated with said optical means for engaging said first guide slot means of said guide member.

3. A zoom lens barrel according to claim 1, including a pin member extending from said barrel part for engaging said second guide slot means of said guide member.

4. A zoom lens barrel according to claim 3, wherein said second guide slot means includes a number of serially connected guide slot sections one of which engages said pin member when said guide member is rotated over said certain range, said one guide slot section extending perpendicularly to said optical axis.

5. A zoom lens barrel according to claim 3, wherein said first guide slot means includes at least one set of serially connected guide slot sections.

* * * * *